(12) United States Patent
Sun et al.

(10) Patent No.: US 9,426,539 B2
(45) Date of Patent: Aug. 23, 2016

(54) INTEGRATED PRESENTATION OF SECONDARY CONTENT

(71) Applicant: INTEL CORPORATION, Santa Clara, CA (US)

(72) Inventors: Chao Sun, Shanghai (CN); Qing Jian Song, Shanghai (CN); Guo Chen, Shanghai (CN); Yang Li, Shanghai (CN); Long Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 14/123,898

(22) PCT Filed: Sep. 11, 2013

(86) PCT No.: PCT/CN2013/083297
§ 371 (c)(1),
(2) Date: Dec. 4, 2013

(87) PCT Pub. No.: WO2015/035566
PCT Pub. Date: Mar. 19, 2015

(65) Prior Publication Data
US 2016/0014473 A1    Jan. 14, 2016

(51) Int. Cl.
*H04N 5/445* (2011.01)
*H04N 21/81* (2011.01)
(Continued)

(52) U.S. Cl.
CPC ............... *H04N 21/812* (2013.01); *G06K 9/52* (2013.01); *G06T 7/004* (2013.01); *G06T 7/20* (2013.01);
(Continued)

(58) Field of Classification Search
CPC ............. H04N 21/4307; H04N 21/44008; H04N 21/44016; H04N 21/4725
See application file for complete search history.

(56) References Cited

U.S. PATENT DOCUMENTS 6,348,918 B1 * 2/2002 Szeliski ............... G06T 7/0075
345/419
6,493,872 B1 * 12/2002 Rangan ............... G06T 7/2033
348/563

(Continued)

FOREIGN PATENT DOCUMENTS

CN    1859565 A    11/2006
EP    2200290 A2    6/2010

OTHER PUBLICATIONS

International Search Report and Written Opinion mailed Jun. 30, 204 for International Application No. PCT/CN2013/083297, 14 pages.
(Continued)

*Primary Examiner* — Pankaj Kumar
*Assistant Examiner* — Timothy Newlin
(74) *Attorney, Agent, or Firm* — Schwabe, Williamson & Wyatt, P.C.

(57) ABSTRACT

Apparatuses, methods and storage medium associated with content distribution and consumption are disclosed herein. In embodiments, an apparatus may include a decoder and a presentation engine. The decoder may be configured to receive and decode a primary content. The presentation engine may be configured to process and present decoded primary content. Processing of the decoded primary content may include identification of a feature in a frame of the primary content, and integration of a secondary content with the feature. Presentation of the decoded primary content may include presentation of the decoded primary content with the secondary content integrated with the feature of the frame. Other embodiments may be described and/or claimed.

25 Claims, 6 Drawing Sheets

(51) Int. Cl.
*H04N 21/44* (2011.01)
*H04N 21/462* (2011.01)
*G06K 9/52* (2006.01)
*G06T 7/00* (2006.01)
*G06T 7/20* (2006.01)
*G06T 7/60* (2006.01)
*H04N 5/265* (2006.01)
*H04N 21/426* (2011.01)
*H04N 21/435* (2011.01)

(52) U.S. Cl.
CPC *G06T 7/60* (2013.01); *H04N 5/265* (2013.01); *H04N 21/42607* (2013.01); *H04N 21/435* (2013.01); *H04N 21/44008* (2013.01); *H04N 21/44016* (2013.01); *H04N 21/4622* (2013.01)

(56) References Cited

U.S. PATENT DOCUMENTS

| | | | | |
|---|---|---|---|---|
| 6,788,809 | B1* | 9/2004 | Grzeszczuk | G06F 3/017 345/419 |
| 6,859,549 | B1* | 2/2005 | Oliensis | G06K 9/209 382/154 |
| 7,743,330 | B1* | 6/2010 | Hendricks | G11B 27/034 715/706 |
| 2002/0112249 | A1* | 8/2002 | Hendricks | H04H 20/10 725/136 |
| 2004/0109585 | A1* | 6/2004 | Tao | G06T 7/0071 382/106 |
| 2006/0256200 | A1* | 11/2006 | Matei | G06T 7/0044 348/208.14 |
| 2008/0077954 | A1* | 3/2008 | Cohen | G11B 27/034 725/32 |
| 2008/0201734 | A1* | 8/2008 | Lyon | G06Q 30/0251 725/34 |
| 2009/0175538 | A1* | 7/2009 | Bronstein | G06F 17/30799 382/173 |
| 2010/0045701 | A1* | 2/2010 | Scott | G01S 5/163 345/633 |
| 2010/0158099 | A1* | 6/2010 | Kalva | H04N 21/23412 375/240.01 |
| 2010/0226626 | A1 | 9/2010 | Lord et al. | |
| 2010/0259595 | A1 | 10/2010 | Trimeche et al. | |
| 2010/0309226 | A1* | 12/2010 | Quack | G06F 17/30244 345/634 |
| 2012/0127171 | A1* | 5/2012 | Li | G06T 7/0075 345/419 |
| 2012/0128241 | A1* | 5/2012 | Jung | G06F 17/30855 382/165 |
| 2013/0208098 | A1* | 8/2013 | Pujol Alcolado | G06T 7/0075 348/47 |
| 2013/0251337 | A1* | 9/2013 | Abecassis | H04N 9/8715 386/239 |
| 2013/0263182 | A1* | 10/2013 | Ivy | H04N 21/458 725/34 |
| 2013/0286221 | A1* | 10/2013 | Shechtman | G06T 5/00 348/187 |
| 2014/0037140 | A1* | 2/2014 | Benhimane | G06K 9/6211 382/103 |
| 2014/0104441 | A1* | 4/2014 | Rime | H04N 5/2621 348/207.1 |
| 2014/0140680 | A1* | 5/2014 | Jo | H04N 9/8715 386/241 |
| 2014/0146086 | A1* | 5/2014 | Kondo | H04N 21/4312 345/660 |
| 2014/0215512 | A1* | 7/2014 | Maruyama | H04N 21/435 725/34 |
| 2014/0267904 | A1* | 9/2014 | Saboune | G08B 6/00 348/460 |
| 2015/0029222 | A1* | 1/2015 | Hofmann | G06K 9/00993 345/633 |

OTHER PUBLICATIONS

Corrected Written Opinion of the International Search Authority mailed Aug. 20, 2014 for International Application No. PCT/CN2013/083297, 7 pages.

* cited by examiner

INTEGRATED PRESENTATION OF SECONDARY CONTENT

CROSS REFERENCE TO RELATED APPLICATIONS

The present application is a national phase entry under 35 U.S.C. §371 of International Application No. PCT/CN2013/083297, filed Sep. 11, 2013, entitled "INTEGRATED PRESENTATION OF SECONDARY CONTENT", which designated, among the various States, the United States of America. The Specification of the PCT/CN2013/083297 Application is hereby incorporated by reference.

TECHNICAL FIELD

The present disclosure relates to the field of data processing, in particular, to apparatuses, methods and storage medium associated with content distribution and presentation that includes integrated presentation of secondary content with primary content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of multi-media contents, and the manners the contents are consumed. Today, multi-media contents may be available from fixed medium (e.g., Digital Versatile Disk (DVD)), broadcast, cable operators, satellite channels, Internet, and so forth. User may consume contents with a wide range of content consumption devices, such as, television set, tablet, laptop or desktop computer, smartphone, or other stationary or mobile devices of the like. In addition to the contents themselves, ease of consumption remains an important factor to the overall user experience and satisfaction.

A significant conflict continues to exist between content providers and content consumers is the provision and viewing of secondary content, such as, commercials/advertisements, provided with free primary content. Content providers of free primary content often want the content consumers to watch the secondary content. Content providers also would like to target the secondary content to the content consumers, e.g., based on the demographics, interests and/or locations of the content consumers, especially in the case of free primary content provided through the Internet. Today, the secondary content are typically selected and integrated with the primary content at the head end, the content distributor side, before they are distributed to the content consumer's content consumption devices. Typically, the secondary content are intrusively interleaved or superimposed on the primary content, which is not very user friendly.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with content distribution and/or consumption, including integrated presentation of secondary content, are disclosed herein. In embodiments, an apparatus, e.g., a set-top box, may include a decoder and a presentation engine. The decoder may be configured to receive and decode a primary content, e.g., a television program. The presentation engine may be configured to process and present decoded primary content. Processing of the decoded primary content may include identification of a feature in a frame of the primary content, and integration of a secondary content, e.g., a commercial/advertisement, with the feature. Presentation of the decoded primary content may include presentation of the decoded primary content with the secondary content integrated with the feature of the frame.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
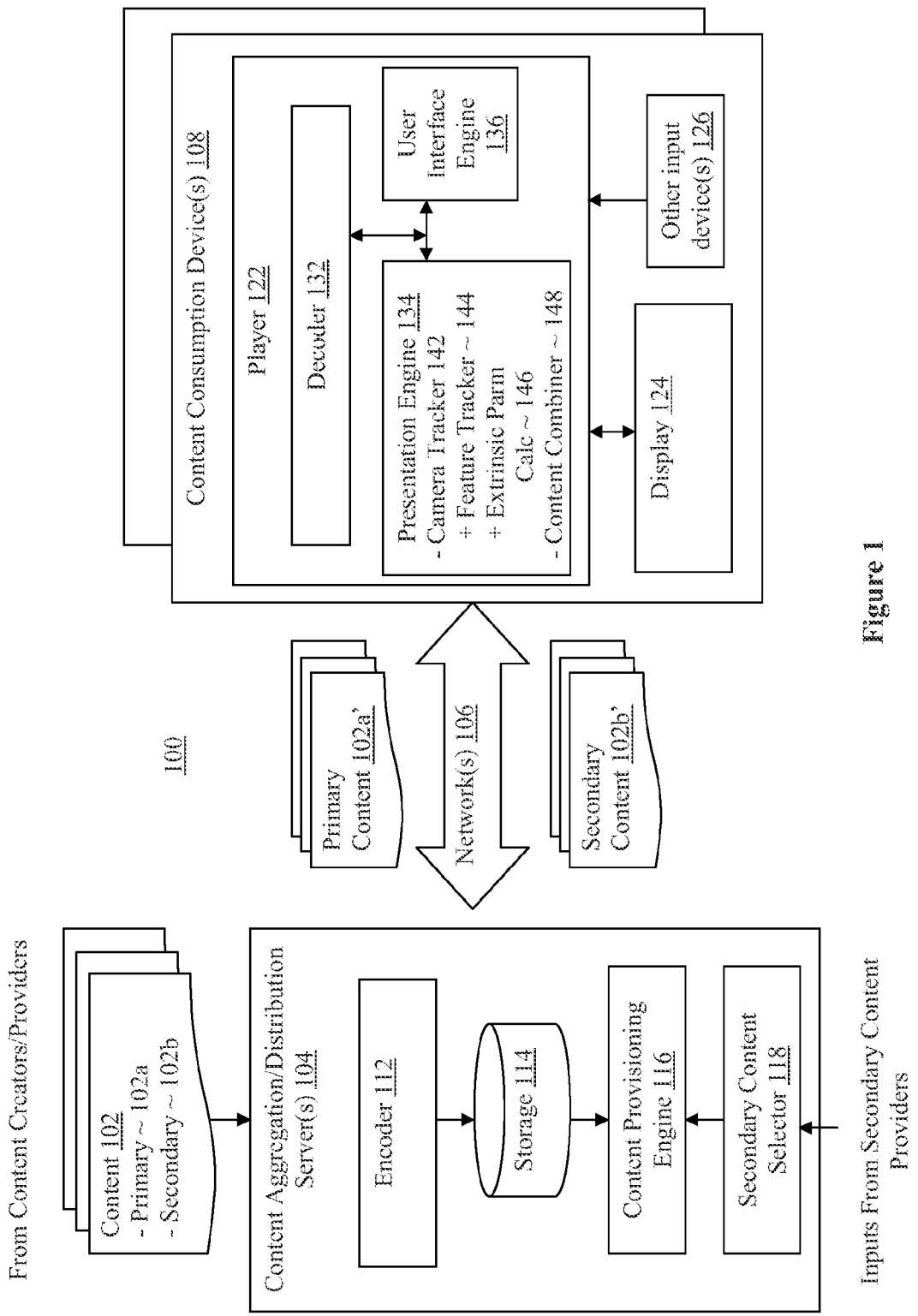
FIG. 1 illustrates an arrangement for content distribution and consumption incorporated with the integrated presentation of secondary content teachings of the present disclosure, in accordance with various embodiments.

Referring now FIG. 1, wherein an arrangement for content distribution and consumption, including integrated presentation of secondary content, in accordance with various embodiments, is illustrated. As shown, in embodiments, arrangement 100 for distribution and consumption of content may include a number of content consumption devices 108 coupled with one or more content aggregation/distribution servers 104 via one or more networks 106. Content aggregation/distribution servers 104 may be configured to aggregate and distribute contents 102 to content consumption devices 108 for consumption, via one or more networks 106. As will be described in more detail below, content aggregation/distribution servers 104 may be configured to aggregate and distribute primary and secondary content 102a and 102b to content consumption devices 108 separately. The primary content 102a may be, but not limited to, on-demand primary content, accordingly, different for different content consumption devices 108, unless some of the content consumption devices 108 happen to request for the same primary content. Even then, the same primary content may not be delivered at the same time, unless the requests for delivery are for the same time. Secondary content 102b may be different for different content consumption devices 108, targeting the content consumers of the content consumer devices 108 based on, but not limited to, the content consumers' demographics, interests, and/or locations. Content consumption devices 108, in turn, may be incorporated with various teachings of the present disclosure to recombine the separately provided primary and secondary content 102a and 102b. In embodiments, the secondary content 102b may be selectively integrated into the primary content 102a, and presented together. These and other aspects will be further described in more detail below.

In embodiments, as shown, content aggregation/distribution servers 104 may include encoder 112, storage 114, content provisioning engine 116, secondary content selector 118, coupled to each other as shown. Encoder 112 may be configured to separately encode primary and secondary content 102a and 102b from various content providers, and storage 114 may be configured to store the separately encoded primary and secondary content 102a and 102b. Content provisioning engine 116 may be configured to selectively retrieve and stream the encoded requested primary content 102a' to the various content consumption devices 108, in response to requests from the various content consumption devices 108. Content provisioning engine 116 may be further configured to selectively retrieve and separately transmit the encoded target secondary content 102b' to the various content consumption devices 108 for integration with the respective requested primary content 102a' on the content consumption devices 108, prior to the presentation of the primary content 102a'. Content provisioning engine 116 may be configured to selectively retrieve and separately transmit the encoded target secondary content 102b', in response to secondary content selection instructions from secondary content selector 118. Secondary content selector 118 may be configured to selectively provide the secondary content selection instructions to content provisioning engine 116, in response to inputs from the secondary content providers.

Figure 2:
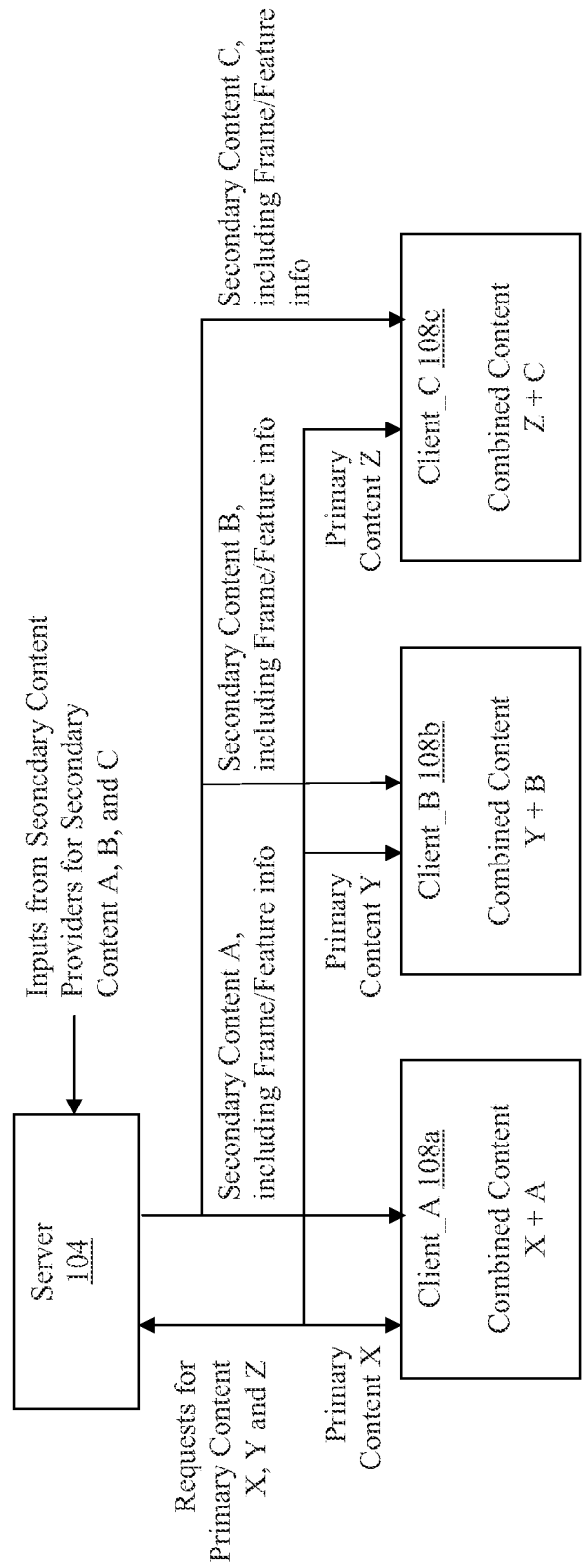
FIG. 2 illustrates the integrated presentation of secondary content of the present disclosure in further detail, in accordance with various embodiments.

Referring now to FIG. 2 wherein integrated presentation of secondary content is illustrated in further detail, in accordance with various embodiments. As shown, server 104, as described earlier, may have received, encoded, and stored primary content X, Y, and Z, as well as secondary content A, B, and C. Server 104 may also have received inputs from secondary content providers for secondary content A, B and C, with respect to the targeting of secondary content A, B, and C, such as, but not limited to, demographics, interests and locations of the content consumers. In response to requests from content consumption devices 108a-108c, for primary content X, Y and Z, server 104 may respectively distribute/stream primary content X, Y and Z to content consumption devices 108a-108c. Further, based on knowledge in possession (e.g., previously collected or given), server 104 may select, and separately transmit secondary content A, B, and C to content consumption devices 108a-108c for respective integrated presentation with primary content X, Y and Z. On receipt, content consumption devices 108a-108c respectively integrate secondary content A, B, and C with the presentation of primary content X, Y, and Z. In embodiments, as will be described in more detail below, content consumption devices 108a-108c may respectively integrate secondary content A, B, and C into features in various frames of primary content X, Y, and Z.

In embodiments, server 104 may provide the identifications and/or descriptions of the features to content consumption devices 108a-108c. In embodiments, server 104 may provide the identifications and/or descriptions of the features to content consumption devices 108a-108c, together with secondary content A, B, and C, as shown. In alternate embodiments, the identifications and/or descriptions of the features may be provided to content consumption devices 108a-108c as part of primary content X, Y, and Z, e.g., as part of the metadata. In still other embodiments, the identifications and/or descriptions of the features may be provided to content consumption devices 108a-108c separate from both primary content X, Y and Z, as well as from secondary content A, B, and C. The separately provided features may or may not be particularized for any of primary content X, Y and Z, and/or secondary content A, B and C. In other words, the identifications and/or descriptions of the features provided to content consumption devices 108a-108c may apply to multiple frames of multiple primary or secondary content. In alternate embodiments, server 104 may also provide the identifications and/or descriptions of frames having the features to content consumption devices 108a-108c.

Referring now back to FIG. 1, primary content 102a may be multi-media contents of various types, having video, audio, and/or closed captions, from a variety of content creators and/or providers. Examples of primary content 102a may include, but are not limited to, movies, TV programming, user created contents (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth. An example of secondary content 102b may include, but is not limited to, a commercial or advertisement, which may be, but is not limited to, an image or a short video (with or without audio). Thus, secondary content provider may be, but is not limited to, an advertiser or the advertiser's agent.

In embodiments, for efficiency of operation, encoder 112 may be configured to transcode the various contents 102, typically in different encoding formats, into a subset of one or more common encoding formats. However, encoder 112 may be configured to nonetheless maintain indices or cross-references to the corresponding contents in their original encoding formats. Similarly, for flexibility of operation, encoder 112 may transcode or otherwise process each or selected ones of contents 102 into multiple versions of different quality levels. The different versions may provide different resolutions, and/or require different bit rates and/or frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video and/or audio data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Content provisioning engine 116 may, in various embodiments, be configured to provide encoded content as discrete files and/or as continuous streams of encoded content. Content provisioning engine 116 may be configured to transmit the compressed audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth.

Continuing to refer to FIG. 1, networks 106 may be any combination of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which servers 104 go through to communicate with content consumption devices 108. Similarly, at the content consumption end, networks 106 may include base stations and/or access points, through which content consumption devices 108 communicate with servers 104. In between the two ends may be any number of network routers, switches and other networking equipment of the like. However, for ease of understanding, these gateways, firewalls, routers, switches, base stations, access points and the like are not shown.

In embodiments, as shown, a content consumption device 108 may include player 122, display 124 and user input device 126. Player 122 may be configured to receive streamed primary content 102a', decode and recovered the primary content 102a' from the content stream, and present the recovered primary content 102a' on display 124, in response to user selections/inputs from user input device 126. Further, player 122 may be configured to receive separately provided secondary content 102b', decode and integrate the secondary content 102b' with the presentation of primary content 102a'.

In embodiments, player 122 may include decoder 132, presentation engine 134 and user interface engine 136. Decoder 132 may be configured to receive streamed primary content 102a' and separately provided secondary content 102b', decode and recover the primary and secondary contents 102a' and 102b'. Presentation engine 134 may be configured to integrate secondary content 102b' into primary content 102a' and present primary content 102a' with secondary content 102b' on display 124, in response to user controls, e.g., stop, pause, fast forward, rewind, and so forth. User interface engine 136 may be configured to receive selections/controls from a content consumer (hereinafter, also referred to as the "user").

In embodiments, presentation engine 134 may include camera tracker 142 and content combiner 148. In embodiments, each frame of primary content 102a' may include the position and pose in space of the camera used to capture the frame. The position of the camera may be represented by a set of (x, y, z) coordinates, which may be the translation of the optical center of the camera, relative to an origin in the scene captured by the frame. The pose of the camera may refer to the heading angles of the camera. The heading angles may have three (3) degrees of freedom, which may be the rotation angle about 3 axes. Camera tracker 142 may be configured to process each frame of primary content 102a', and retrieve camera and pose information for the frame. In embodiments, camera tracker 142 may further include feature tracker 144 and extrinsic parameter calculator 146. In embodiments, feature tracker 144 may be configured to identify and track features within the various frames of primary content 102a'. Extrinsic parameters calculator 146 may be configured to calculate various extrinsic parameters for content combiner 148. Content combiner 148 may be configured to integrate secondary content 102b' with features identified and tracked by feature tracker 144, using extrinsic parameters calculated by extrinsic parameters calculator 146. Embodiments of camera tracker 142, including feature tracker 144 and extrinsic parameter calculator 146, and content combiner 148, including their operations will be further described below with references to FIGS. 3 and 6.

Still referring to FIG. 1, while shown as part of a content consumption device 108, display 124 and/or user input device(s) 126 may be standalone devices or integrated, for different embodiments of content consumption devices 108. For example, for a television arrangement, display 124 may be a stand-alone television set, Liquid Crystal Display (LCD), Plasma and the like, while player 122 may be part of a separate set-top set, and other user input device 126 may be a separate remote control or keyboard. Similarly, for a desktop computer arrangement, player 122, display 124 and other input device(s) 126 may all be separate stand alone units. On the other hand, for a laptop, ultrabook, tablet or smartphone arrangement, player 122, display 124 and other input devices 126 may be integrated together into a single form factor. Further, for tablet or smartphone arrangement, a touch sensitive display screen may also server as one of the other user input device(s) 126, and player 122 may be a computing platform with a soft keyboard that also include one of the user input device(s) 126.

Figure 3:
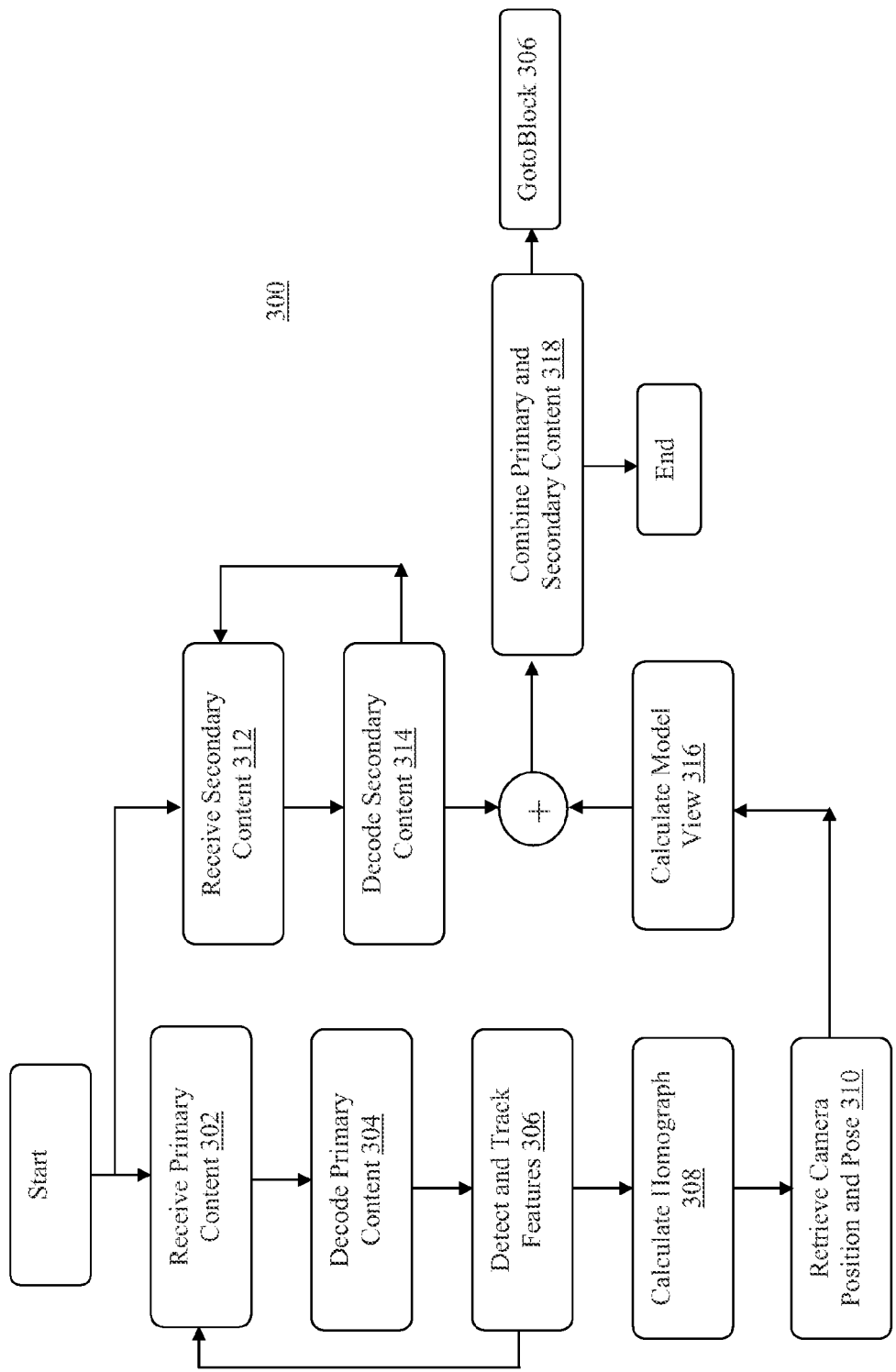
FIG. 3 illustrates an example process for integrated presentation of secondary content, in accordance with various embodiments.

Referring now to FIG. 3, wherein an example process for integrated presentation of secondary content, in accordance with various embodiments, is illustrated. As shown, process 300 may include operations at blocks 302-318. Operations within blocks 302-304 and 312-314 may be performed, e.g., by earlier described decoder 132. Operations within blocks 306-310 may be performed, e.g., by the earlier described camera tracker 142, including feature tracker 144 and extrinsic parameters calculator 146. Operations within blocks 316 and 318 may be performed, e.g., by content combiner 148. While for ease of understanding, the various operations are being described as performed by the various example components, in alternate embodiments, the operations may be distributed differently, with some of the components combined or subdivided. Further, each of camera tracker 142, including feature tracker 144 and extrinsic parameters calculator 146, and/or content combiner 148 may be implemented in hardware and/or software. When implemented in software, the component may be implemented in instructions of the instruction set architecture (ISA) supported by the underlying processor, or in high level languages with compiler support to compile the high level language instructions into the instructions of the underlying processor's ISA.

At blocks 302 and 304, process 300 may receive and decode primary content 102a'. In embodiments, primary content 102a' may include multiple frames. Blocks 302 and 304 may be repeated to successively receive and decode the multiple frames of primary content 102a'. Subsequently or concurrently, at blocks 312 and 314, process 300 may receive and decode secondary content 102b'. In embodiments, secondary content 102b' may be a single image, or a video with multiple frames, Blocks 312 and 314 may be repeated to successively receive and decode the multiple frames of secondary content 102b'. From block 304, process 300 may proceed to block 306. From 314, process 300 may await the completion of block 316.

At block 306, for each frame, process 300 may identify and track feature of interest within the frame. As described earlier, the feature identification and/or description can be pre-collected by or pre-provided to process 300. To identify and track the feature of interest, process 300 may first detect feature points in a frame-i, in embodiments, may use, but not limited to, a key-point recognition method using random ferns, and then, may use, but not limited to, a 3D template matching algorithm to track object in video images. As a result, auto-detect and track feature, so need not to know which frame the feature will appear. However, in alternate embodiments, identification and/or descriptions of the frames with the features of interest may be provided. For these embodiments, detection and tracking of features within block 306 may be performed only for frames with features of interest.

From block 306, for each frame with the feature of interest detected, process 300 may proceed to block 308. At block 308, process 300 calculate a homograph $H_w^i$ between frame-i and the feature, as follows:

$$X_i = P_i X_w = \lambda KM = \lambda K \begin{pmatrix} R_1 & R_2 & R_3 & T \\ 0 & 0 & 0 & 1 \end{pmatrix} X_w \quad \text{Equation 1}$$

$$\begin{pmatrix} x_i \\ y_i \\ 1 \end{pmatrix} = \lambda K \begin{pmatrix} R_1 & R_2 & R_3 & T \\ 0 & 0 & 0 & 1 \end{pmatrix} \begin{pmatrix} x_w \\ y_w \\ 0 \\ 1 \end{pmatrix} = \quad \text{Equation 2}$$

$$\lambda K \begin{pmatrix} R_1 & R_2 & T \\ 0 & 0 & 1 \end{pmatrix} \begin{pmatrix} x_w \\ y_w \\ 1 \end{pmatrix} = H_w^i \begin{pmatrix} x_w \\ y_w \\ 1 \end{pmatrix}$$

where i means $i^{th}$ frame in sequence; $X_w=(x_w,y_w,z_w,1)$ is the homogeneous coordinates of a feature point in the world coordinate system; $X_i^t=(x_i,y_i,1)$ is the projection of $X_w$ on the image plane (frame); $\lambda$ is a scaling factor; K is the intrinsic matrix of the camera, which may obtained via calibration offline, $$K = [A, 0] \quad K = [A, 0],$$

where $$A = \begin{bmatrix} \alpha_x, & \gamma, & u_0 \\ 0, & \alpha_y, & v_0 \\ 0, & 0, & 1 \end{bmatrix},$$

$\alpha_x = f \cdot m_x$ and $\alpha_y = f \cdot m_y$ represent focal length in terms of pixels, where $m_x$ and $m_y$ are the scale factors relating pixels to distance. $\gamma$ represents the skew coefficient between the x and the y axis, and may be 0. $u_0$ and $v_0$ represent the principal point, which would be ideally in the center of the frame.

In embodiments, the feature may be a plane. Accordingly, $z_w$ is zero. Consequently, equation 1 may deduce to equation 2. From equation 2, the homograph $H_w^i$ may be calculated, when 4 feature points' projections are detected.

From block 308, for the frame with the homograph $H_w^i$ calculated, process 300 may proceed to block 310. At block 310, process 300 may retrieve the camera position and pose for the frame. In embodiments, the camera position and pose of a frame may be encoded in an extrinsic parameter matrix M of the frame, in terms of rotation components ($R_1$, $R_2$, $R_3$), and translation component T, as follows:

$$M = \begin{bmatrix} R_1, & R_2, & R_3, & T \\ 0, & 0, & 0, & 1 \end{bmatrix}.$$

In embodiments, the extrinsic parameter matrix M for the frame may be determined using the homograph $H_w^i$. Then the components ($R_1$, $R_2$, $R_3$) & T for the frame may be extracted from M and subsequently used to calculate the model-view matrix of the frame to integrate secondary content into the identified feature of the frame.

In embodiments, ($R_1$, $R_2$, $R_3$) & T of the frame may be determined as follow:

from equation 2, it may be determined as follows:

$$H_w^i = \lambda K \begin{bmatrix} R1, & R2, & T \\ 0 & 0 & 1 \end{bmatrix} \quad \text{Equation 3}$$

which may be rewritten as a column expression as shown below, given K=[A, 0], $$[H_1, H_2, H_3] = \lambda[A, 0] \cdot \begin{bmatrix} R1 & R2 & T \\ 0 & 0 & 1 \end{bmatrix} = [\lambda AR1, \lambda AR2, \lambda AT] \quad \text{Equation 4}$$

Accordingly, it may be determined for the frame, that $$R_1 = \frac{1}{\lambda} A^{-1} H_1, \quad R_2 = \frac{1}{\lambda} A^{-1} H_2, \quad T = \frac{1}{\lambda} A^{-1} H_3$$

Further, by virtue of the orthogonal relationship, $R_3$ of the frame may be determined as follows:

$$R_3 = R_1 \times R_2. \quad \text{Equation 5}$$

From block 310, process 300 may proceed to block 316. At block 316, process 300 may proceed to determine a model-view matrix for the frame. In embodiments, the model-view matrix may be a combination of model and view transform. Model transform may be the transform to convert from object space to world space, whereas view transform may be the transform to convert from world space to eye space. The transformations enable the underlying graphics hardware be able to render the secondary content on the correct position and pose for the frame.

More specifically, from block 316, process 300 may proceed to block 318. At block 318, process 300 may texture the secondary content on the identified feature of the frame, using the model-view matrix. From block 318, process 300 may return to block 306 if there are more secondary content 102b' to be integrated into additional frames of primary content 102a' for presentation. The secondary content 102b' to be integrated into additional frames of primary content 102a' for presentation may be the same or different secondary content 102b'. Process 300 may end, when there are no more secondary content 102b' to be integrated into additional frames of primary content 102a' for presentation.

Figure 6:
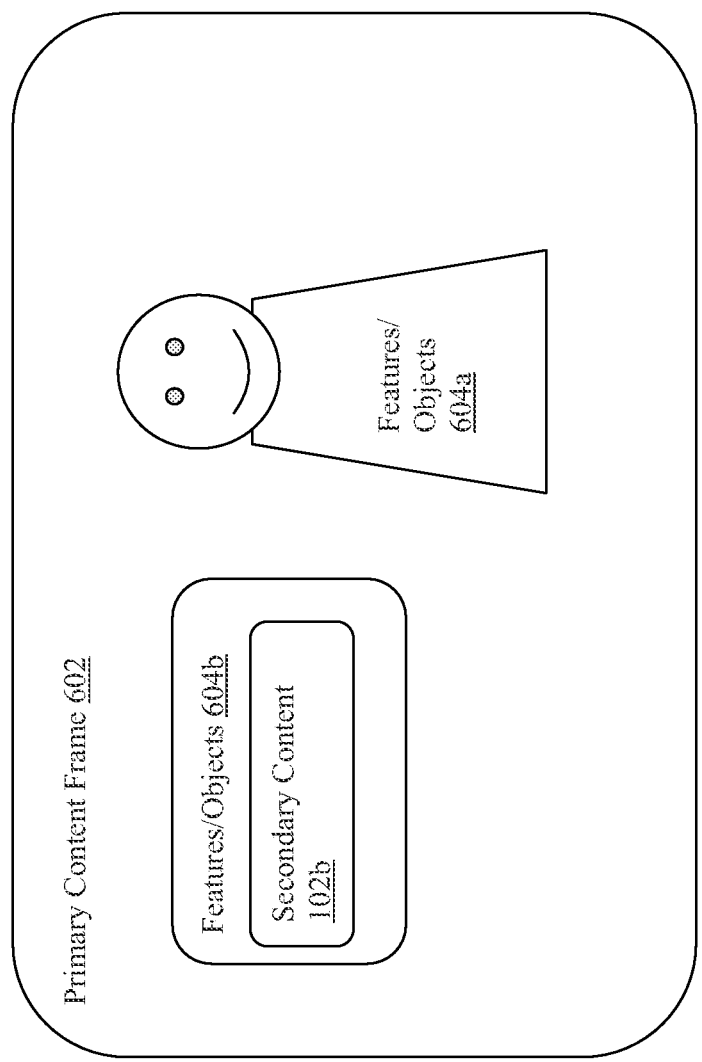
FIG. 6 illustrates an example integrated presentation of secondary content of the present disclosure, in accordance with various embodiments.

FIG. 6 illustrates an example integrated presentation of secondary content, in accordance with embodiments. As shown, example primary content frame 602 may include a number of features/objects including, but are not limited to, features/objects 604a and 604b. In this illustration, features/objects 604a may be a person, whereas feature/object 604b may be a picture, which is the interested feature for integrated presentation of secondary content 102b'. As shown, using process 300, feature/object 604b may be identified and tracked, and secondary content 102b' may be textured onto feature/object 604b. As a result, advertisements may be implanted into program content (such as television programs) seamlessly and naturally, without interrupting the program content, leading to enhanced experience for content consumers. Further, provision of advertisement and program content are no longer confined to the prior art linear model, i.e., parallel and targeted advertising may be provided, with advertisers being able to have more advertisement time, and achieve more accuracy in targeting.

In embodiments, as described earlier, secondary content 102b' may include audio. In embodiments, the secondary content 102b' may be integrated into one or more frames where the audio may be played without compromising the consumption experience of the content consumer, e.g., in a quiet scene of primary content 102a', or a scene of primary content 102a' with merely background or inconsequential audio.

Figure 4:
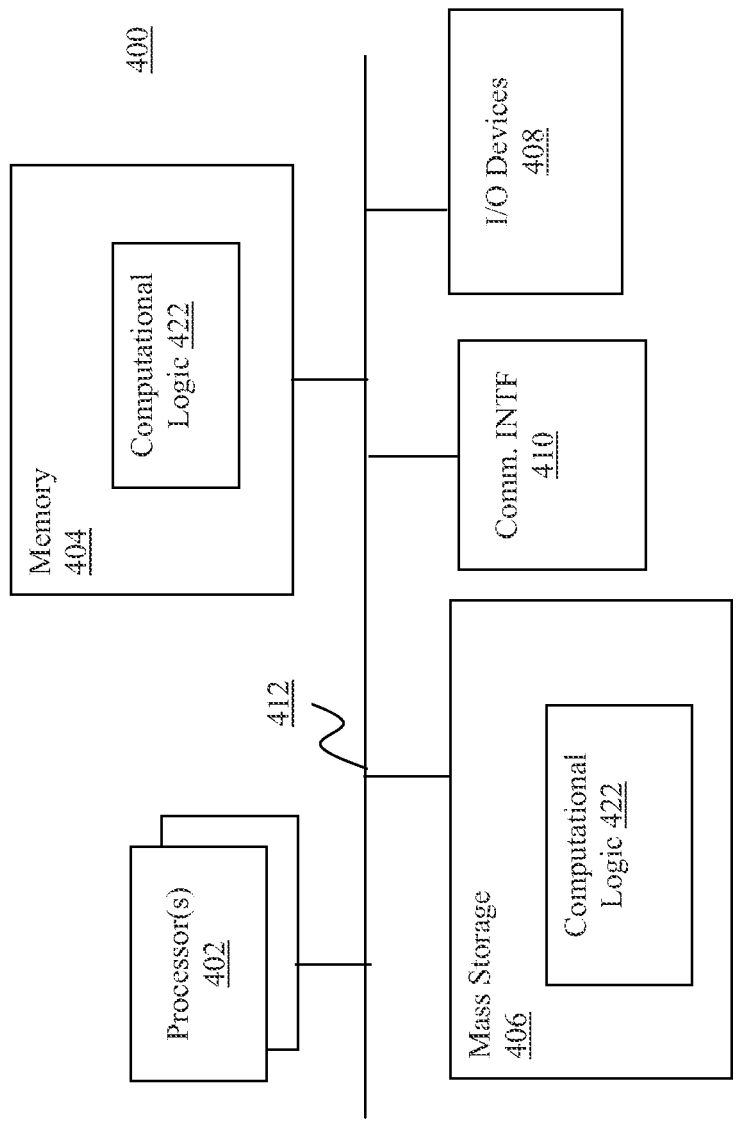
FIG. 4 illustrates an example computing environment suitable for practicing the disclosure, in accordance with various embodiments.

Referring now to FIG. 4, wherein an example computer suitable for use for the arrangement of FIG. 1, in accordance with various embodiments, is illustrated. As shown, computer 400 may include one or more processors or processor cores 402, and system memory 404. For the purpose of this application, including the claims, the terms "processor" and "processor cores" may be considered synonymous, unless the context clearly requires otherwise. Additionally, computer 400 may include mass storage devices 406 (such as diskette, hard drive, compact disc read only memory (CD-ROM) and so forth), input/output devices 408 (such as display, keyboard, cursor control and so forth) and communication interfaces 410 (such as network interface cards, modems and so forth). The elements may be coupled to each other via system bus 412, which may represent one or more buses. In the case of multiple buses, they may be bridged by one or more bus bridges (not shown).

Each of these elements may perform its conventional functions known in the art. In particular, system memory 404 and mass storage devices 406 may be employed to store a working copy and a permanent copy of the programming instructions implementing the operations associated with content aggregation/distribution servers 104 or content consumption devices 108, earlier described, in particular, the operations associated with integrating secondary content 102b' with primary content 102a' for presentation. The various elements may be implemented by assembler instructions supported by processor(s) 402 or high-level languages, such as, for example, C, that can be compiled into such instructions.

The permanent copy of the programming instructions may be placed into permanent mass storage devices 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The number, capability and/or capacity of these elements 410-412 may vary, depending on whether computer 400 is used as a content aggregation/distribution server 104 or a content consumption device 108. When use as content consumption device, whether the content consumption device is a stationary or mobile device, like a smartphone, computing tablet, ultrabook or laptop. Their constitutions are otherwise known, and accordingly will not be further described.

Figure 5:
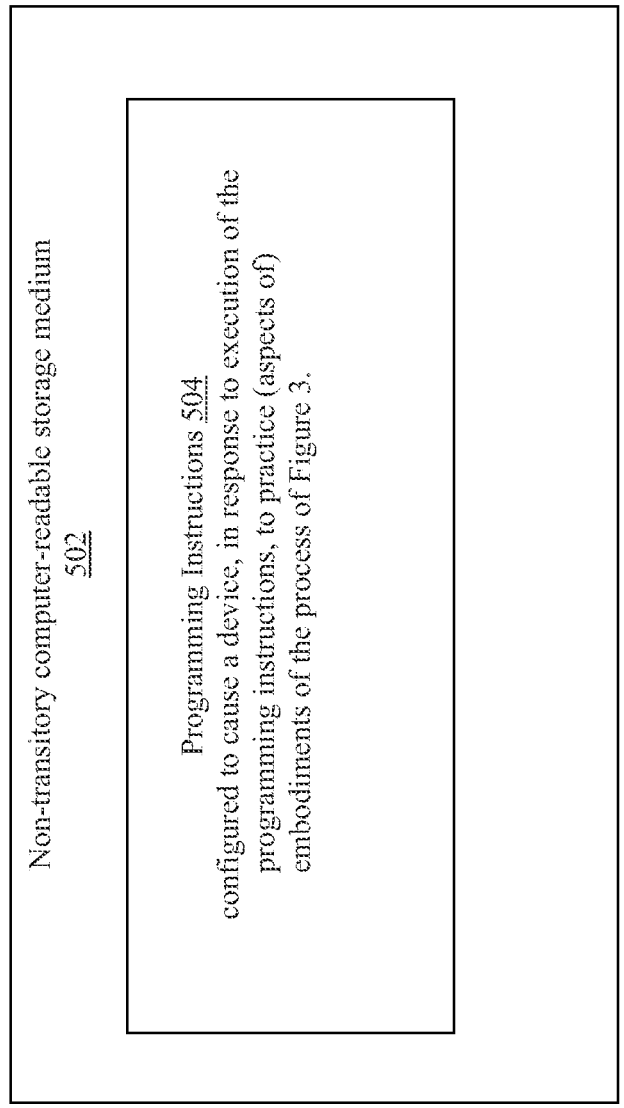
FIG. 5 illustrates an example storage medium with instructions configured to enable an apparatus to practice the present disclosure, in accordance with various embodiments.

FIG. 5 illustrates an example computer-readable non-transitory storage medium having instructions configured to practice all or selected ones of the operations associated with content aggregation/distribution servers 104 or content consumption devices 108, earlier described; in accordance with various embodiments. As illustrated, non-transitory computer-readable storage medium 502 may include a number of programming instructions 504. Programming instructions 504 may be configured to enable a device, e.g., computer 400, in response to execution of the programming instructions, to perform, e.g., various operations of process 300 of FIG. 3, e.g., but not limited to, the operations associated with integrating secondary content 102b' with primary content 102a' for presentation. In alternate embodiments, programming instructions 504 may be disposed on multiple computer-readable non-transitory storage media 502 instead. In alternate embodiments, programming instructions 504 may be disposed on computer-readable transitory storage media 502, such as, signals.

Referring back to FIG. 4, for one embodiment, at least one of processors 402 may be packaged together with computational logic 422 (in lieu of storing on memory 404 and mass storage device 406) configured to practice aspects of the process of FIG. 3. For one embodiment, at least one of processors 402 may be packaged together with computational logic 422 configured to practice aspects of the process of FIG. 3 to form a System in Package (SiP). For one embodiment, at least one of processors 402 may be integrated on the same die with computational logic 422 configured to practice aspects of the process of FIG. 3. For one embodiment, at least one of processors 402 may be packaged together with computational logic 422 configured to practice aspects of the process of FIG. 3 to form a System on Chip (SoC). For at least one embodiment, the SoC may be utilized in, e.g., but not limited to, a set-top box.

Thus various example embodiments of the present disclosure have been described including, but are not limited to:

Example 1, which may be an apparatus for consuming content. The apparatus may include a decoder and a presentation engine, coupled with each other. The decoder may be configured to receive and decode a primary content. The presentation engine may be configured to process and present decoded primary content. Process of the decoded primary content may include identification of a feature in a frame of the primary content, and integration of a secondary content with the feature. Presentation of the decoded primary content may include presentation of the decoded primary content with the secondary content integrated with the feature of the frame.

Example 2 may be example 1, wherein the primary content may be streamed to the apparatus, and the decoder may be configured to receive and decode streamed primary content.

Example 3 may be example 1 or 2, wherein the decoder or the presentation engine may be further configured to receive the secondary content or identification or description of the feature. Further, the secondary content or the identification or description of the feature may be provided to the apparatus separate from the primary content.

Example 4 may be any one of examples 1-3, wherein the presentation engine may further include a camera tracker module configured to retrieve a position or a pose of the camera for the frame.

Example 5 may be any one of examples 1-4, wherein the presentation engine may further include a feature tracking module configured to identify the feature in the frame.

Example 6 may be example 5, wherein the feature tracking module may be configured to calculate a homograph for the frame and the feature.

Example 7 may be example 6, wherein the presentation engine may further include an extrinsic parameters module configured to calculate a plurality of extrinsic parameters, based at least in part on the homograph.

Example 8 may be example 7, wherein the presentation engine may further include a content combiner configured to compute a model view, based at least in part on the extrinsic parameters, and texture the secondary content on the identified feature to integrate the secondary content with the feature of the frame, using the model view.

Example 9 may be any one of examples 1-8, wherein the presentation engine may further include a content combiner configured to texture the secondary content on the identified feature to integrate the secondary content with the feature of the frame.

Example 10 may be any one of examples 1-9, wherein the secondary content may include an advertisement.

Example 11 may be any one of examples 1-10, wherein the apparatus may include a selected one of a smartphone, a computing tablet, a netbook, an e-reader, a laptop computer, a desktop computer, a game console or a set-top box.

Example 12 may be one or more storage medium having a plurality of instructions configured to cause an apparatus, in response to execution of the instructions, to consume content. Further, consumption of content may include the apparatus being caused to receive and decode a primary content; and process and present decoded primary content. Process of the decoded primary content may include identification of a feature in a frame of the primary content, and integration of a secondary content with the feature. Presentation of the decoded primary content may include presentation of the decoded primary content with the secondary content integrated with the feature of the frame.

Example 13 may be example 12, wherein the primary content may be streamed to the apparatus.

Example 14 may be example 12 or 13, wherein the apparatus is further caused to receive the secondary content. The secondary content may be provided to the apparatus separate from the primary content.

Example 15 may be any one of examples 12-14, wherein the apparatus may be further caused to receive identification or description of the feature.

Example 16 may be any one of examples 12-15, wherein the apparatus may be further caused to identify the feature in the frame.

Example 17 may be example 16, wherein the apparatus may be further caused to calculate a homograph for the frame and the feature.

Example 18 may be example 17, wherein the apparatus may be further caused to calculate a plurality of extrinsic parameters, based at least in part on the homograph.

Example 19 may be example 18, wherein the apparatus may be further caused to compute a model view, based at least in part on the extrinsic parameters, and to texture the secondary content on the identified feature to integrate the secondary content with the feature of the frame, using the model view.

Example 20 may be any one of examples 12-18, wherein the apparatus may be further caused to texture the secondary content on the identified feature to integrate the secondary content with the feature of the frame.

Example 21 may be example 20, wherein the secondary content may include an advertisement.

Example 22 may be a method for consuming content. The method may include receiving and decoding, by a computing device, a primary content; and processing and presenting, by the computing device, decoded primary content. Processing the decoded primary content may include identifying a feature in a frame of the primary content, and integrating a secondary content with the feature. Presenting the decoded primary content may include presenting the decoded primary content with the secondary content integrated with the feature of the frame.

Example 23 may be example 22, wherein the primary content is streamed to the computing device.

Example 24 may be example 22 or 23, further comprising receiving the secondary content. The secondary content may be provided to the computing device separate from the primary content.

Example 25 may be any one of examples 22-24, further including receiving, by the computing device, identification or description of the feature.

Example 26 may be any one of examples 22-25, further including identifying, by the computing device, the feature in the frame.

Example 27 may be example 26 further including calculating, by the computing device, a homograph for the frame and the feature.

Example 28 may be example 27 further including calculating, by the computing device, a plurality of extrinsic parameters, based at least in part on the homograph.

Example 29 may be example 28 further including computing, by the computing device, a model view, based at least in part on the extrinsic parameters, and texturing, by the computing device, the secondary content on the identified feature to integrate the secondary content with the feature of the frame, using the model view.

Example 30 may be any one of examples 22-28, further including texturing the secondary content on the identified feature to integrate the secondary content with the feature of the frame.

Example 31 may be example 30, wherein the secondary content comprises an advertisement.

Example 32 may be an apparatus. The apparatus may include means for receiving and decoding a primary content; and means for processing and presenting decoded primary content. Processing the decoded primary content may include identifying a feature in a frame of the primary content, and integrating a secondary content with the feature. Presenting the decoded primary content may include presenting the decoded primary content with the secondary content integrated with the feature of the frame.

Example 33 may be example 32, wherein the primary content is streamed to the apparatus.

Example 34 may be example 32 or 33, further including for receiving the secondary content. The secondary content may be provided to the apparatus separate from the primary content.

Example 35 may be any one of examples 32-34, further including means for receiving identification or description of the feature.

Example 36 may be any one of examples 32-35, further including means for identifying the feature in the frame.

Example 37 may be any one of examples 32-36, further including means for calculating a homograph for the frame and the feature.

Example 38 may be any one of examples 32-37, further including means for calculating a plurality of extrinsic parameters, based at least in part on the homograph.

Example 39 may be any one of examples 32-38, further including means for computing a model view, based at least in part on the extrinsic parameters, and means for texturing the secondary content on the identified feature to integrate the secondary content with the feature of the frame, using the model view.

Example 40 may be any one of examples 32-38, further including means for texturing the secondary content on the identified feature to integrate the secondary content with the feature of the frame.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the examples.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for consuming content, comprising:
one or more processors;
a decoder to be operated by the one or more processors to receive and decode a primary content; and
a presentation engine coupled to the decoder, to be operated by the one or more processors to process and present decoded primary content, wherein process of the decoded primary content includes identification of a feature in a frame of the primary content, and integration of a secondary content with the feature, and wherein presentation of the decoded primary content includes presentation of the decoded primary content with the secondary content integrated with the feature of the frame;
wherein the presentation engine includes a feature tracking function to identify the feature in the frame;
wherein the feature tracking function is to calculate a homograph $H_w^i$ between frame-i and the feature, as follows:

$$X_i = P_i X_w = \lambda KM = \lambda K \begin{pmatrix} R_1 & R_2 & R_3 & T \\ 0 & 0 & 0 & 1 \end{pmatrix} X_w \quad \text{Equation 1}$$

$$\begin{pmatrix} x_i \\ y_i \\ 1 \end{pmatrix} = \lambda K \begin{pmatrix} R_1 & R_2 & R_3 & T \\ 0 & 0 & 0 & 1 \end{pmatrix} \begin{pmatrix} x_w \\ y_w \\ 0 \\ 1 \end{pmatrix} = \quad \text{Equation 2}$$

$$\lambda K \begin{pmatrix} R_1 & R_2 & T \\ 0 & 0 & 1 \end{pmatrix} \begin{pmatrix} x_w \\ y_w \\ 1 \end{pmatrix} = H_w^i \begin{pmatrix} x_w \\ y_w \\ 1 \end{pmatrix}$$

where i means $i^{th}$ frame in sequence; $X_w = (x_w, y_w, z_w, 1)$ is homogeneous coordinates of a feature point in a world coordinate system;
$X_i' = (x_i, y_i, 1)$ is projection of $X_w$ on the frame's image plane;
$\Lambda$ is a scaling factor; and
K is an intrinsic matrix of a camera that captured the frame.

2. The apparatus of claim 1, wherein the primary content is streamed to the apparatus, and the decoder is configured to receive and decode streamed primary content.

3. The apparatus of claim 1, wherein the decoder or the presentation engine is to further receive the secondary content or identification or description of the feature, wherein the secondary content or the identification or description of the feature is provided to the apparatus separate from the primary content.

4. The apparatus of claim 1, wherein the presentation engine comprises a camera tracker module to be operated by the one or more processors to retrieve a position or a pose of the camera for the frame.

5. The apparatus of claim 1, wherein the presentation engine further comprises an extrinsic parameters module to be operated by the one or more processors to calculate a plurality of extrinsic parameters, based at least in part on the homograph.

6. The apparatus of claim 5, wherein the presentation engine further comprises a content combiner to be operated by the one or more processors to compute a model view, based at least in part on the extrinsic parameters, and texture the secondary content on the identified feature to integrate the secondary content with the feature of the frame, using the model view.

7. The apparatus of claim 1, wherein the presentation engine further comprises a content combiner to be operated by the one or more processors to texture the secondary content on the identified feature to integrate the secondary content with the feature of the frame.

8. The apparatus of claim 7, wherein the secondary content comprises an advertisement, or the apparatus comprises a selected one of a smartphone, a computing tablet, a netbook, an e-reader, a laptop computer, a desktop computer, a game console or a set-top box.

9. The apparatus of claim 1, wherein K is obtained via calibration offline, K=[A, 0], where $$A = \begin{bmatrix} \alpha_x, & \gamma, & u_0 \\ 0, & \alpha_y, & v_0 \\ 0, & 0, & 1 \end{bmatrix},$$

$\alpha_x = f \cdot m_x$ and $\alpha_y = f \cdot m_y$ represent focal length in terms of pixels, where $m_x$ and $m_y$ are scale factors relating pixels to distance; $\gamma$ represents a skew coefficient between the x and the y axis, and equals 0; and $u_0$ and $v_0$ represent a principal point, disposed at a center of the frame.

10. A method for consuming content, comprising:

receiving and decoding, by a computing device, a primary content; and processing and presenting, by the computing device, decoded primary content, wherein processing the decoded primary content includes identifying a feature in a frame of the primary content, and integrating a secondary content with the feature; and wherein presenting the decoded primary content includes presenting the decoded primary content with the secondary content integrated with the feature of the frame;

wherein identifying a feature in a frame includes calculating a homograph $H_w^i$ between frame-i and the feature, as follows:

$$X_i = P_i X_w = \lambda KM = \lambda K \begin{pmatrix} R_1 & R_2 & R_3 & T \\ 0 & 0 & 0 & 1 \end{pmatrix} X_w \quad \text{Equation 1}$$

$$\begin{pmatrix} x_i \\ y_i \\ 1 \end{pmatrix} = \lambda K \begin{pmatrix} R_1 & R_2 & R_3 & T \\ 0 & 0 & 0 & 1 \end{pmatrix} \begin{pmatrix} x_w \\ y_w \\ 0 \\ 1 \end{pmatrix} = \quad \text{Equation 2}$$

$$\lambda K \begin{pmatrix} R_1 & R_2 & T \\ 0 & 0 & 1 \end{pmatrix} \begin{pmatrix} x_w \\ y_w \\ 1 \end{pmatrix} = H_w^i \begin{pmatrix} x_w \\ y_w \\ 1 \end{pmatrix}$$

where i means $i^{th}$ frame in sequence; $X_w = (x_w, y_w, z_w, 1)$ is homogeneous coordinates of a feature point in a world coordinate system;

$X_i^t = (x_i, y_i, 1)$ is projection of $X_w$ on the frame's image plane;

$\Lambda$ is a scaling factor; and

K is an intrinsic matrix of a camera that captured the frame.

11. The method of claim 10, wherein the primary content is streamed to the computing device.

12. The method of claim 10, further comprising receiving the secondary content or identification or description of the feature, wherein the secondary content or identification or description of the feature is provided to the computing device separate from the primary content.

13. The method of claim 10, further comprising retrieving, by the computing device, a position or pose of the camera for the frame.

14. The method of claim 10, further comprising calculating, by the computing device, a plurality of extrinsic parameters, based at least in part on the homograph.

15. The method of claim 14, further comprising computing, by the computing device, a model view, based at least in part on the extrinsic parameters, and texturing, by the computing device, the secondary content on the identified feature to integrate the secondary content with the feature of the frame, using the model view.

16. The method of claim 10, further comprising texturing the secondary content on the identified feature to integrate the secondary content with the feature of the frame.

17. The method of claim 10, further comprising obtaining K via calibration offline, K=[A, 0], where $$A = \begin{bmatrix} \alpha_x, & \gamma, & u_0 \\ 0, & \alpha_y, & v_0 \\ 0, & 0, & 1 \end{bmatrix},$$

$\alpha_x = f \cdot m_x$ and $\alpha_y = f \cdot m_y$ represent focal length in terms of pixels, where $m_x$ and $m_y$ are scale factors relating pixels to distance; $\gamma$ represents a skew coefficient between the x and the y axis, and equals 0; and $u_0$ and $v_0$ represent a principal point, disposed at a center of the frame.

18. At least one non-transitory computer-readable storage medium comprising a plurality of instructions configured to cause an apparatus, in response to execution of the instructions, to consume content, wherein to consume content, the apparatus is to:

receive and decode a primary content; and process and present decoded primary content, wherein process of the decoded primary content includes identification of a feature in a frame of the primary content, and integration of a secondary content with the feature; and wherein presentation of the decoded primary content includes presentation of the decoded primary content with the secondary content integrated with the feature of the frame;

wherein identification of a feature calculation of a homograph $H_w^i$ between frame-i and the feature is as follows:

$$X_i = P_i X_w = \lambda K M = \lambda K \begin{pmatrix} R_1 & R_2 & R_3 & T \\ 0 & 0 & 0 & 1 \end{pmatrix} X_w \quad \text{Equation 1}$$

$$\begin{pmatrix} x_i \\ y_i \\ 1 \end{pmatrix} = \lambda K \begin{pmatrix} R_1 & R_2 & R_3 & T \\ 0 & 0 & 0 & 1 \end{pmatrix} \begin{pmatrix} x_w \\ y_w \\ 0 \\ 1 \end{pmatrix} = \quad \text{Equation 2}$$

$$\lambda K \begin{pmatrix} R_1 & R_2 & T \\ 0 & 0 & 1 \end{pmatrix} \begin{pmatrix} x_w \\ y_w \\ 1 \end{pmatrix} = H_w^i \begin{pmatrix} x_w \\ y_w \\ 1 \end{pmatrix}$$

where i means $i^{th}$ frame in sequence; $X_w=(x_w,y_w,z_w,1)$ is homogeneous coordinates of a feature point in a world coordinate system;

$X_i^t=(x_i,y_i,1)$ is projection of $X_w$ on the frame's image plane;

$\Lambda$ is a scaling factor; and

K is an intrinsic matrix of a camera that captured the frame.

19. The storage medium of claim 18, wherein the primary content is streamed to the apparatus.

20. The storage medium of claim 18, wherein the apparatus is further caused to receive the secondary content, wherein the secondary content is provided to the apparatus separate from the primary content.

21. The storage medium of claim 18, wherein the apparatus is further caused to receive identification or description of the feature.

22. The storage medium of claim 18, wherein the apparatus is further caused to:
calculate a plurality of extrinsic parameters, based at least in part on the homograph;
compute a model view, based at least in part on the extrinsic parameters, and to texture the secondary content on the identified feature to integrate the secondary content with the feature of the frame, using the model view.

23. The storage medium of claim 18, wherein the apparatus is further caused to texture the secondary content on the identified feature to integrate the secondary content with the feature of the frame.

24. The storage medium of claim 18, wherein the secondary content comprises an advertisement.

25. The at least one computer-readable storage medium of claim 18, wherein K is obtained via calibration offline, K=[A, 0], where $$A = \begin{bmatrix} \alpha_x & \gamma & u_0 \\ 0 & \alpha_y & v_0 \\ 0 & 0 & 1 \end{bmatrix},$$

$\alpha_x = f \cdot m_x$ and $\alpha_y = f \cdot m_y$ represent focal length in terms of pixels, where $m_x$ and $m_y$ are scale factors relating pixels to distance; $\gamma$ represents a skew coefficient between the x and the y axis, and equals 0; and $u_0$ and $v_0$ represent a principal point, disposed at a center of the frame.

\* \* \* \* \*